Jan. 25, 1938.   T. H. SLOAN   2,106,193
METHOD OF MAKING HOLLOW GLASSWARE
Filed Nov. 30, 1935   2 Sheets-Sheet 1
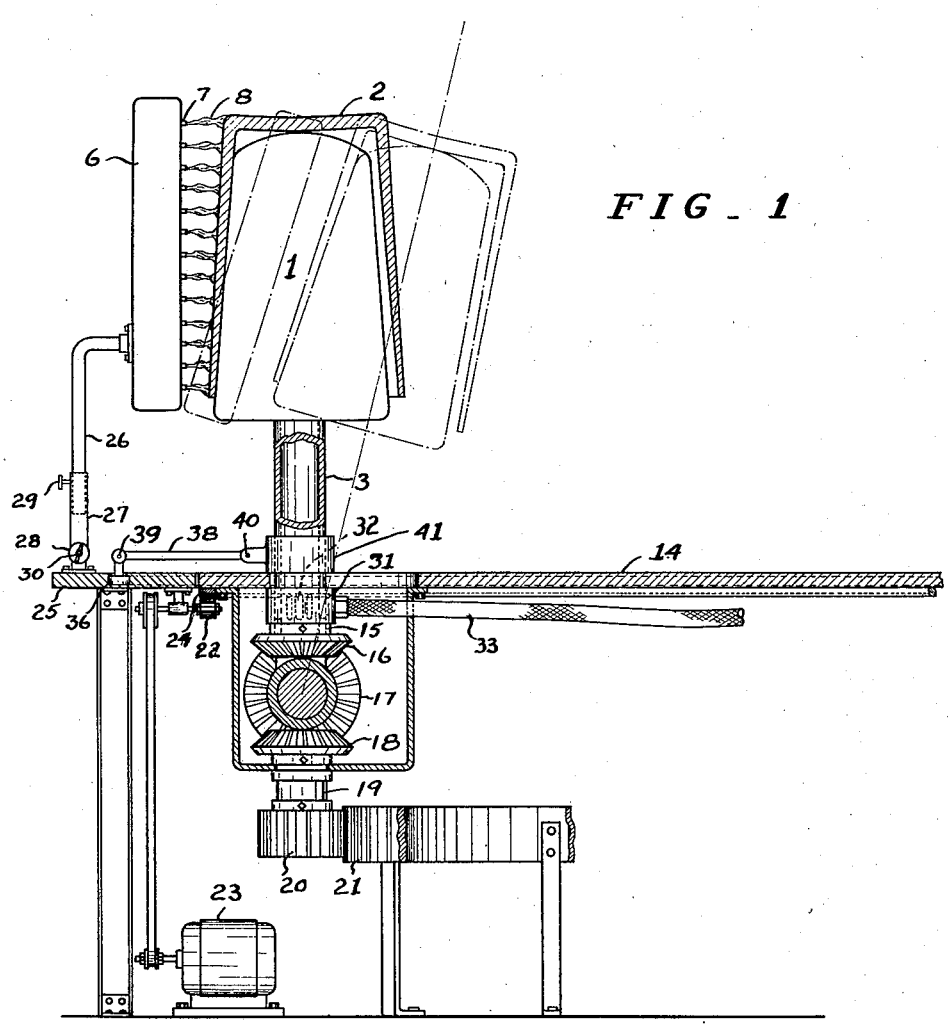
FIG_1
FIG_2
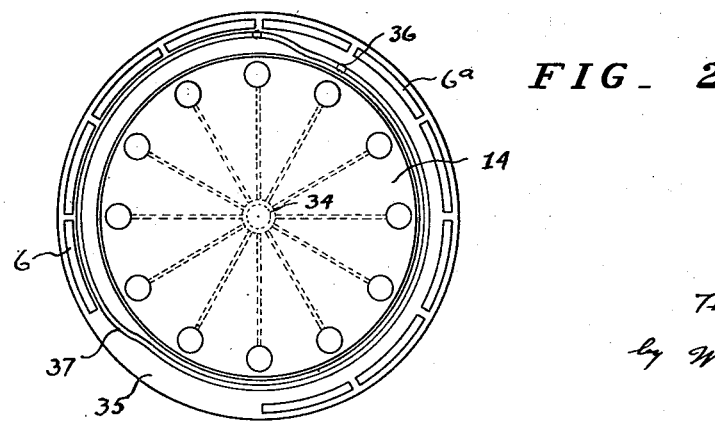
INVENTOR
Theodore H. Sloan
by William B. Jaspert
Attorney.

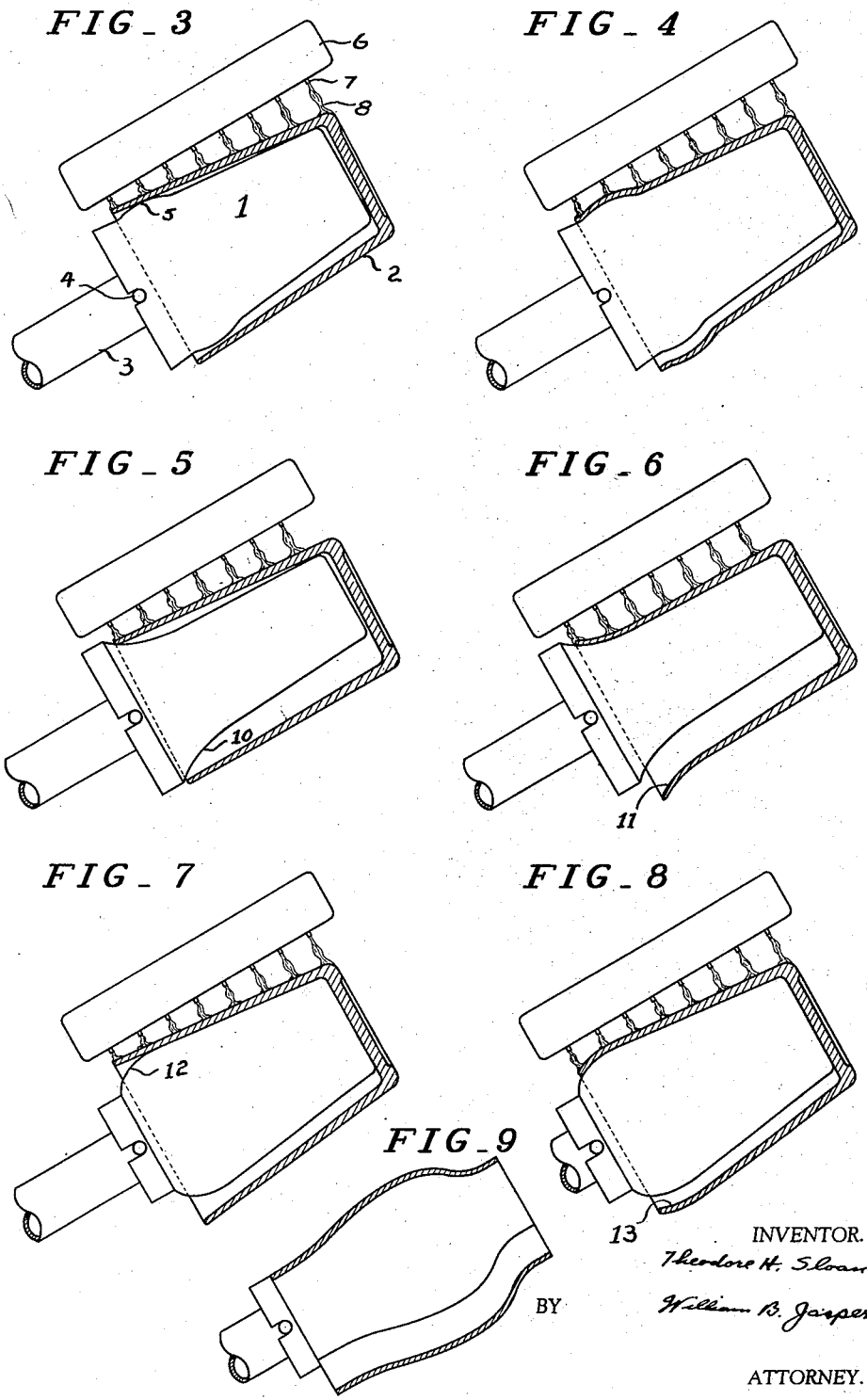

Patented Jan. 25, 1938

2,106,193

UNITED STATES PATENT OFFICE 2,106,193

METHOD OF MAKING HOLLOW GLASSWARE

Theodore H. Sloan, Charleroi, Pa., assignor to G. M. S. Corporation, Pittsburgh, Pa., a corporation of Pennsylvania Application November 30, 1935, Serial No. 52,363

6 Claims. (Cl. 49—58)

This invention relates to new and useful improvements in apparatus for and method of shaping fire-polishing and heat-treating glass tumblers and the like.

It is among the objects of the invention to provide means for economically producing from a blank of one shape tumblers of various shapes without the use of a variety of expensive blank molds and other glass forming equipment.

Another object of the invention is to provide means for heat treating the tumblers after being shaped to increase their strength or to retain a desired shape when once retained.

Still another object of the invention is the provision of means whereby a large number of glass articles can be produced simultaneously by simple and economical apparatus and in an expeditious manner.

In an application serially numbered 47,233, filed October 29, 1935, I have disclosed a method of forming hollow glass ware such as tumblers and the like by the employment of paste molds, without inverting the article during the fabricating steps.

To produce such articles economically, it is desirable to obviate the expense of utilizing finish molds of ornamental configurations or contour.

The present invention constitutes a step for treating the articles, thus made, to shape them to desired contour with or without simultaneously subjecting them to a heat treating process.

Briefly stated, the present invention contemplates the utilization of inexpensive forming equipment on which the glass tumbler or other article is supported and subjected to heat to render the glass sufficiently plastic to conform itself to the contour of the support.

While so mounted, the support and consequently the article is subjected to rotary movement to uniformly expose the material to the heating or cooling medium.

The invention will become more apparent from a consideration of the accompanying drawings constituting a part hereof in which like reference characters designate like parts and in which:

Figure 1 is a sectional elevational view of a device embodying the principles of my invention;

Figure 2 a top plan view diagrammatically illustrating the apparatus for simultaneously acting upon a plurality of tumblers and like articles;

Figures 3 to 9 inclusive are sectional elevational views of the forming devices illustrating the adaptation thereof to the shaping of glass articles to different forms in accordance with the principles of the invention.

Referring to Figures 3 to 9 inclusive of the drawings, the numeral 1 designates a shaping device on which tumblers 2 are supported, the support being mounted on shafts 3 to be revolved therewith through a key or pin 4 which is carried by the shaft. The support 1 may be of various shapes such as the convex portion 5, Figure 3, and is of smaller diameter than the tumbler 2. The support is adapted to expose the article to the heat of a burner 6 having a plurality of jets 7 for impinging the flame 8 against the outer surface of the glass.

The support 1 is subjected to continuous rotation and the tumbler 3 revolves with the support by the traction produced through its own weight on the supporting surface. While thus rotated, the glass is heated to a slightly plastic condition whereby it adapts itself to the contour of the support in the manner shown in Figure 4, with the portion of the tumbler wall adjacent the mouth conforming itself to the convex portion 5 which produces a concavity 9 in the tumbler. As shown in Figures 5 and 6, the support may have a concave shape 10 which produces a flared mouth 11 on the tumbler as shown in Figure 6 or the support may be rounded at its end as shown by the numeral 12 in Figure 7 of the drawing, which produces a constricted mouth 13 as shown in Figure 8.

Figure 9 illustrates a blank support shaped to produce lamp chimneys or lantern globes.

A plurality of forms like the forms 1 or forms of different shapes may be mounted on a rotating or movable support as shown in Figures 1 and 2 of the drawings. Figures 1 and 2 illustrate a rotary table 14 on which a plurality of shaping supports 1 are mounted in angularly spaced relation adjacent a plurality of stationary burners 6, or cooling members 6a. In Figure 1 the shaping supports 1 are shown mounted on hollow shafts 3 which are mounted in sleeves 15 that are provided with a beveled gear 16 that meshes with an idler gear 17 which in turn interacts with a bevel gear 18 carried by a shaft 19, having a pinion 20 that engages a stationary gear rack 21 mounted below the turn-table 14. The turn-table 14 is rotated by a pinion 22 driven by a motor 23, said pinion interacting with an annular rack 24 attached beneath the turn-table 14. Burners 6 are mounted on an annular support 25 adjacent the turn table 14, the burners being supported by conduits 26 telescopically arranged in sleeves 27, having an elbow connection 28 with a source of fuel supply, a set screw 29 being provided to adjust the height of the burner 6 relative to the ware, and valve 30 controls and varies the fuel supply to the burners.

The hollow shafts 3 of the ware-forming supports 1 are inserted in sleeves 31 and are provided with slotted openings 32 communicating with the interior of the sleeves 31. Flexible conduits 33 are connected to communicate with the slots 32 of the shafts 3 at one end and are connected to a manifold 34, Figure 2, at their other end leading to a source of cooling medium, such as compressed air or the like.

The glass articles 2 are loaded on the formers 1 at the charging station designated by numeral 35, Figure 2, with the shafts 3 in the vertical position shown in Figure 1. In this position the ware is initially heated and is then tilted as shown in Figures 3 to 9 of the drawings. To this end, the shafts 3 are actuated by cam followers 36, Figure 1, which travel in a cam slot 37, Figure 2. Links 38 pivoted at 39 and 40 to the followers 36 and a ring clamp 41 actuate shafts 3 in their vertical and inclining movements. The burners 6 and air supplying members 6a may be adjusted to the inclination of the formers 1 at any point of their travel along track 37.

The operation of the apparatus shown in Figure 1 and Figure 2 is briefly as follows: The ware is passed along burners and blowers 6 and 6a by rotary movement of table 14. The bevel gear drive 16, 17 and 18 will maintain driving contact with the pinion 20 for any angle of the supporting sleeve or shaft 3. When the turn table is subjected to angular movement through the pinion drive 22, the pinion 20 engaging the stationary rack 21 will revolve the bevel gears 16, 17 and 18 to cause the forming support to rotate in the manner described in connection with Figures 3 to 9 inclusive of the drawings.

While thus rotating, the tumblers mounted on the supports pass along the stationary burners 6, as shown in Figure 2, to quickly heat the glass tumbler and cause it to conform itself to the shape or contour of the supporting element.

If it is desired to cool the support 1 and the formed article, a cooling medium is supplied through the manifold 34 and conduits 33 to the hollow shaft 3, thence to the interior of the shaping supports to prevent undesirable heating or to fix the shape when attained. Also, this method of cooling may be utilized to temper or fix surface tension in the ware by chilling its interior surface. The exterior surface may be similarly treated by the application of an air blast instead of fuel through the units after the tumbler is shaped to the desired contour. This quick cooling or heat treating produces unusual strength in the glass.

It is evident from the foregoing description of the invention that the method lends itself to the making of the glass tumblers of ornamental shapes and configuration by an inexpensive and simple process without the utilization of expensive glass forming molds. The speed of shaping may be varied by angular variation of the spindles 3.

Referring to Figure 6, uniform application of heat may be attained if desirable by shaping the burner to conform to the shape of the article. Similarly, the relative proximity of the burners may be adjusted to the various parts of the tumblers by the means provided to alter the temperature along the tumbler, whereby certain portions are softened throughout or at selected spots. The burners are vertically as well as angularly adjustable and may be made short or tall to suit the work to be done. They may be compartment types adapted to deliver more fuel to the center or ends of the burners at the will of the operator.

Although one embodiment of the invention has been herein illustrated and described, it will be evident to those skilled in the art that various modifications may be made in the details of construction without departing from the principles herein set forth, and that the method is adapted for making lamp chimneys and similar shaped hollow ware.

I claim:

1. The steps in the method of shaping glass articles which comprise providing a shaping support having a portion of its supporting surface of the desired surface contour of the finished article and having its axis adapted for adjustment to different angles, the cross-section of the support at any point along its axis being smaller than the corresponding cross-section of the glass blank placing a preformed glass article of substantially straight-sides on said shaping support, subjecting the outer surface of the article to uniform heating temperature to render it plastic, tilting said support and subjecting the supporting article to rotary movement whereby the article, when plastic, adapts itself to the contour of the support.

2. The method of shaping glass articles which comprises providing a shaping support having a portion of its supporting surface of the desired surface contour of the finished article, the cross-section of the support at any point along its axis being smaller than the corresponding cross-section of the glass blank placing a preformed blank of glass on said support, subjecting said support to rotary movement, moving the support adjacent a series of burners to impinge a heating flame on the surface of the glass, and tilting said support while maintaining rotary movement thereof to cause the wall of the glass blank to conform itself to the surface contour of the shaping support with which it is in contact.

3. Apparatus for shaping glass articles comprising a rotary table, a plurality of shaping supports mounted in angularly spaced relation thereon, each of said supports comprising a matrix portion of substantially the surface contour desired in the finished article, a shaft pivotally mounted to the table for carrying said shaping supports, means for rotating the shafts, a series of burners adjacent the rotary table adapted to project the burner flame in the path of travel of the rotary supports, and means responsive to rotary movement of the table to vary the inclination of the shaping supports relative to a vertical axis.

4. Apparatus for shaping glass articles comprising a movable support, rotary shafts mounted on said support being adapted to be inclined from the vertical during movement of said support, shaping molds mounted on said shafts having matrix surfaces corresponding to the desired contour of the finished article, means for cooling said mold, means in the path of travel of said mold for impinging a burner flame on the article carried by said molds, and means for subjecting the articles to a surface treatment other than heat during a portion of its travel on the movable support.

5. Apparatus for shaping glass articles comprising a movable support, means for mounting a plurality of shaping molds in spaced relation on said support, said means including rotary shafts for subjecting the molds to rotary movement, a plurality of burner elements in the path of movement of the forming molds, a cam track and connections for said rotary mold and followers disposed in the cam track and connected to the molds to incline the latter from a normal vertical position to varying degrees in accordance with the shape of said cam track.

6. The steps in the method of making glass articles which consist in placing a substantially straight-sided glass blank on a support having its surface of the desired configuration and shape, the cross-section of the support at any point along its axis being smaller than the corresponding cross-section of the glass blank, exposing the blank to a heating medium, subjecting the blank and support to rotary movement and tilting the support to rest the weight of the blank on the upper portion of the shaped surface thereof, whereby the glass after attaining the desired degree of plasticity will conform itself to the surface contour of the shaped support.

THEODORE H. SLOAN.